J. RADDIN,

Assignor to THE POPE MANUFACTURING COMPANY.

CARRIAGE WHEEL.

No. 9,963. Reissued Dec. 6, 1881.

WITNESSES
J. W. Keith
H. I. Nash

INVENTOR
John Raddin
By Charles E. Pratt
Atty

UNITED STATES PATENT OFFICE.

JOHN RADDIN, OF LYNN, ASSIGNOR TO THE POPE MANUFACTURING COMPANY, OF BOSTON, MASSACHUSETTS.

CARRIAGE-WHEEL.

SPECIFICATION forming part of Reissued Letters Patent No. 9,963, dated December 6, 1881.

Original No. 72,538, dated December 24, 1867; antedated December 10, 1867. Application for reissue filed June 16, 1881. Patented in England February 21, 1867.

*To all whom it may concern:*

Be it known that I, JOHN RADDIN, of Lynn, in the county of Essex and State of Massachusetts, have invented certain Improvements in Carriage-Wheels, of which the following is a specification.

These improvements were set forth in my British Letters Patent, dated 21st February, 1867, and sealed the 17th May, 1867, and numbered 470 of the year 1867, by relation to George Haseltine.

My improvements relate to that class of carriage-wheels each having a metallic felly or fellies, and consist in constructing such wheels with fellies made of wrought-metal tubes, the outer surfaces of which are flattened, or adapted and modified to form the tread of the wheel, or the surface to which a tread or tire may be applied, and in constructing such metallic tubular fellies so as to receive and contain in a convenient and desirable manner the heads of the spokes and elastic cushions applied thereto, with the cylinders or boxes in which the heads of the spokes and the cushions play, and in the combination, with such metallic or tubular fellies and metallic spokes, of a washer or holder for the spoke, in which the outer end of the spoke is held within the felly and prevented from drawing through the inner side thereof.

Figure 1:
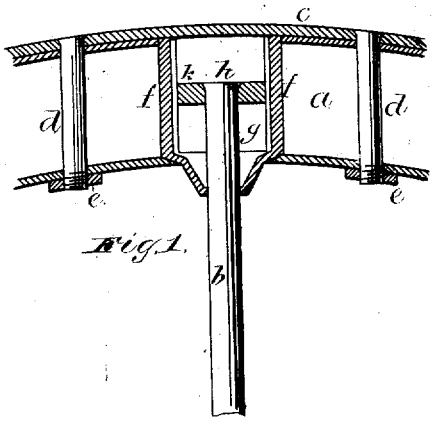
Figure 2:
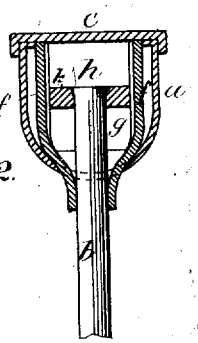

In the drawings, Figure 1 shows in cross-section a hollow felly and spoke containing my improvements in one form. Fig. 2 shows in longitudinal section, on a plane at right angles to that of Fig. 1, a portion of the same contrivance.

*a* is the felly or rim. *b* is one of the spokes. The felly is tubular or hollow, being made from a wrought-metal tube or pipe compressed at the sides, if desirable, and flattened at the outer surface. The outer surface of the felly may constitute the tread of the wheel, or it may be adapted to receive a tire, and I generally prefer to apply a steel tire, *c*, which may be secured to the felly by bolts *d* and nuts *e*. Where the elastic cushions are used in connection with such felly the arrangement thereof may be as follows: The outer end of each spoke works through the inner end of a box or cylinder, *f*, at the bottom of which box is a rubber block or cushions, *g*, placed under the head of the spoke, or under a washer, *k*, applied thereto. Over the head of the spoke a cushion, *h*, is shown, and both may be used or either one, as may be deemed desirable, the strain coming upon the rubber as the rim expands or contracts radially. Where the tire *c* is used the boxes or cylinders *f* may be entered through the upper surface of the felly, and the lower end of each be contracted and extended through a hole bored through the inner side of the felly, as seen in the drawings, such arrangement enabling the cylinders to be applied with facility and in such manner as to secure each in position, as will be readily understood.

For the construction of the felly for wheels of light vehicles wrought-iron gas-pipe may be used, in which case the sides should be flattened, as shown in the drawings.

I do not hereby intend to limit myself strictly to the specific form or details of the device shown in the drawings.

It is obvious that by the construction of the felly in a hollow or tubular form the amount of metal required in its construction can be reduced without impairing its strength and rigidity, or, on the other hand, with the same weight of metal a much stronger wheel may be secured. It is also obvious that the cushions in the rim between the end of the spoke and the head of the wheel, or between the plate *k* and the inner side of the felly, operate to relieve the jar incident to the wheel and its load from the movement of the wheel over obstructions or inequalities of surface of the road, or to make the wheel elastic.

I am aware that wheels have been described and shown having a metallic felly and metallic spokes, wherein the spoke was held by a nut in the felly and a nut at the other end in the hub; but my metallic holder or plate, in which the felly end of the spoke is swiveled or held by heading or by a nut in addition to the metallic plate or holder, I consider different in construction and purpose, and original with me.

I do not claim a nutted spoke in combination with a metallic rim.

I claim as new and of my invention—

1. In the construction of carriage-wheels, making the felly or rim thereof of wrought-metal tube, the outer surface of which is flattened and surfaced by a tire, substantially as and for the purposes set forth.

2. In combination with such tubular felly, the elastic cushions arranged to operate substantially as described.

3. In a carriage-wheel, the combination of a hollow metallic felly, and a metallic spoke, and a metal plate or holder containing the end of the spoke, and holding the same within the felly, substantially as set forth.

4. A metallic felly constructed to receive and combined with a headed metallic spoke, a tire to bear the tread of the wheel, and having elastic cushions interposed between the end of the spoke and the tread of the wheel, essentially as set forth.

JOHN RADDIN.

Witnesses:
JOSEPH F. BROWN,
C. S. HOWARD.